United States Patent
Muraoka et al.

(10) Patent No.: US 11,014,613 B2
(45) Date of Patent: May 25, 2021

(54) SIDE BODY VEHICLE STRUCTURE

(71) Applicant: Mazda Motor Corporation, Hiroshima (JP)

(72) Inventors: Shuji Muraoka, Iwakuni (JP); Yamato Matsuda, Hiroshima (JP); Toshihiro Takebayashi, Kure (JP); Toshiyuki Koga, Hiroshima (JP); Kazuhisa Hatano, Hiroshima (JP); Morihide Yamada, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 91 days.

(21) Appl. No.: 16/400,997

(22) Filed: May 1, 2019

(65) Prior Publication Data

US 2019/0344830 A1  Nov. 14, 2019

(30) Foreign Application Priority Data

May 14, 2018  (JP) .............................. JP2018-093166

(51) Int. Cl.
*B62D 21/15* (2006.01)
*B60K 1/04* (2019.01)
(Continued)

(52) U.S. Cl.
CPC .......... *B62D 21/157* (2013.01); *B60J 5/0459* (2013.01); *B60J 5/0479* (2013.01); *B60K 1/04* (2013.01);
(Continued)

(58) Field of Classification Search
CPC .... B62D 21/157; B62D 25/025; B60J 5/0479; B60K 1/04; B60K 2001/0438
(Continued)

(56) References Cited

U.S. PATENT DOCUMENTS 5,671,968 A * 9/1997 Masuda ............... B62D 21/157
                                                   296/187.12
6,305,737 B1   10/2001 Corder et al.
(Continued)

FOREIGN PATENT DOCUMENTS

DE    102008005490 A1    7/2009
DE    102015214085 A1    1/2017
(Continued)

OTHER PUBLICATIONS

European Patent Office, Extended European Search Report Issued in Application No. 19173444.1, dated Oct. 23, 2019, Germany, 9 pages.

*Primary Examiner* — Gregory A Blankenship
(74) *Attorney, Agent, or Firm* — Alleman Hall Creasman & Tuttle LLP

(57) ABSTRACT

A side body vehicle structure is disclosed that has a pair of left and right side sills and opposite swing type side doors. The side sills may have an upper flange portion facing the rear door in the vehicle width direction which functions as a rear door facing part, and the upper flange portion of a more forward part of the vehicle than the rear door facing part may function as a front door facing part. The rear door facing part may be formed in a shape having a length in the vehicle vertical direction longer than a length in a vehicle vertical direction of the front door facing part. In a vertical cross section along the vehicle width direction, a gusset member may form a closed cross section with the side sill inner member, and an upper end thereof may be joined to the rear door facing part.

10 Claims, 11 Drawing Sheets

(51) Int. Cl.
  *B60J 5/04*   (2006.01)
  *B62D 25/02*  (2006.01)
(52) U.S. Cl.
  CPC .... *B62D 25/025* (2013.01); *B60K 2001/0438* (2013.01)
(58) Field of Classification Search
  USPC ............................. 296/187.12, 203.02, 209
  See application file for complete search history.

(56) References Cited

U.S. PATENT DOCUMENTS

| | | | | |
|---|---|---|---|---|
| 7,950,719 | B2* | 5/2011 | Elliott | E05D 15/1081 |
| | | | | 296/155 |
| 8,646,833 | B2* | 2/2014 | Fujii | B62D 21/157 |
| | | | | 296/209 |
| 8,661,617 | B1* | 3/2014 | Kim | B60J 5/0451 |
| | | | | 16/82 |
| 9,701,182 | B1* | 7/2017 | Hallman | B62D 25/04 |
| 9,862,309 | B2* | 1/2018 | Oliverio | F21S 43/15 |
| 2003/0006625 | A1* | 1/2003 | Moriyama | B60J 5/0412 |
| | | | | 296/146.6 |
| 2003/0160476 | A1* | 8/2003 | Moriyama | B60J 5/043 |
| | | | | 296/202 |
| 2009/0072583 | A1* | 3/2009 | Elliott | B60J 5/0479 |
| | | | | 296/155 |
| 2010/0156140 | A1* | 6/2010 | Elliott | B60J 5/0479 |
| | | | | 296/146.5 |
| 2014/0231162 | A1* | 8/2014 | Shirooka | B60K 1/04 |
| | | | | 180/68.5 |
| 2015/0175218 | A1* | 6/2015 | Yoshioka | B62D 25/025 |
| | | | | 296/203.01 |
| 2017/0015360 | A1* | 1/2017 | Onishi | B62D 21/157 |
| 2017/0203792 | A1* | 7/2017 | Sunohara | B62D 21/157 |
| 2017/0233009 | A1* | 8/2017 | Miranda | B60R 22/24 |
| | | | | 296/193.05 |
| 2017/0305248 | A1* | 10/2017 | Hara | B60L 50/66 |
| 2018/0086188 | A1* | 3/2018 | Tamao | B60J 5/0418 |
| 2018/0147919 | A1* | 5/2018 | Grupp | E05F 15/00 |
| 2018/0236863 | A1* | 8/2018 | Kawabe | B62D 25/025 |
| 2018/0305959 | A1* | 10/2018 | Abbott | E05B 85/045 |
| 2018/0337377 | A1* | 11/2018 | Stephens | H01M 2/1083 |
| 2019/0009824 | A1* | 1/2019 | Watanabe | B62D 25/025 |
| 2019/0344830 | A1* | 11/2019 | Muraoka | B60K 1/04 |
| 2019/0359265 | A1* | 11/2019 | Tsuyuzaki | B62D 25/025 |
| 2019/0389285 | A1* | 12/2019 | Horita | B60J 5/0444 |
| 2019/0390491 | A1* | 12/2019 | Yokogawa | E05B 83/38 |
| 2020/0282816 | A1* | 9/2020 | Matsuda | B62D 25/20 |

FOREIGN PATENT DOCUMENTS

| | | |
|---|---|---|
| EP | 1340641 A1 | 9/2003 |
| FR | 3049260 A1 | 9/2017 |
| JP | 2003341553 A | 12/2003 |

* cited by examiner

SIDE BODY VEHICLE STRUCTURE

FIELD OF THE INVENTION

The present invention relates to a side body vehicle structure of a vehicle in which, for example, a doorway provided for the ingress and egress of passengers is accessed by a pair of oppositely hinged outswinging doors including a front-hinged door and a rear-hinged door, herein referred to as opposite swing type side doors.

BACKGROUND ART

In a vehicle such as an automobile, a doorway provided at a side part of the vehicle for a passenger ingress and egress is covered with side doors that are freely openably and closably supported by the vehicle body. As one example of such side doors, as disclosed in Patent Document 1, so-called opposite swing type side doors are known, which comprise a front door that is freely openably and closably supported by the vehicle body on a front side of the doorway and a rear door that is freely openably and closably supported by the vehicle body on a rear side of the doorway.

Such opposite swing type side doors tend to have low rigidity against a compression load acting toward the inside of the vehicle in the vehicle width direction. Therefore, compared with a vehicle having a center pillar joined to the vehicle body so as to partition the front part and the rear part of the doorway, when a colliding object collides with a side part of the vehicle a vehicle having opposite swing type side doors has a risk that the side door may be greatly deformed toward the inside of the vehicle cabin.

Therefore, in a vehicle having opposite swing type side doors, for example, by incorporating a center pillar extending in the vehicle vertical direction in the vicinity of the front end of the rear door, rigidity of the rear door against the compression load toward the inside of the vehicle in the vehicle width direction is improved and deformation of the rear door at the time of a side collision is suppressed.

However, when the rigidity and the mechanical strength of a side sill against a compression load toward the inside of the vehicle in the vehicle width direction are not sufficient, the side sill might not stably support the rear door on which the compression load acts toward the inside of the vehicle in the vehicle width direction. Therefore, even if rigidity of the rear door against the compression load toward the inside of the vehicle in the vehicle width direction is improved, intrusion of the rear door into the vehicle cabin at the time of the side collision might not be able to be sufficiently suppressed.

RELATED ART

Patent Document

[PATENT DOCUMENT 1] Japanese Unexamined Patent Application Publication 2003-341553

SUMMARY OF THE INVENTION

Problems to be Solved by the Invention

In view of the above issues, an object of the present invention is to provide a side body vehicle structure of a vehicle capable of suppressing an intrusion of a rear door into the vehicle cabin at the time of a side collision.

Brief Summary of the Invention

The present invention is directed to a side body vehicle structure of a vehicle having a pair of left and right side sills extending in a vehicle longitudinal direction and separated by a predetermined distance in a vehicle width direction of the vehicle, and opposite swing type side doors which cover, freely openably and closably, a doorway for passenger ingress and egress, wherein each of the side sills has a respective upper flange portion, which, in a vertical cross section along the vehicle width direction, includes a portion of a side sill outer member having a substantially hat-shaped cross section that is raised toward an upper part of the vehicle and a portion of a side sill inner member having a substantially hat-shaped cross section that is raised toward an upper part of the vehicle, wherein the side door has a rear door that covers a rear part of the doorway, wherein a rear door facing flange portion of the upper flange portion faces the rear door in the vehicle width direction, and a front door facing flange portion of the upper flange portion is more forward on the vehicle than the rear door facing flange portion, wherein the rear door facing flange portion is formed in a shape having a length in the vehicle vertical direction longer than a length in a vehicle vertical direction of the front door facing flange portion, and wherein a gusset member is provided, which, in a vertical cross section along the vehicle width direction, has an upper end joined to the rear door facing flange portion and forms a closed cross section with the side sill inner member.

According to the present invention, intrusion of a rear door into the vehicle cabin at the time of a side collision can be suppressed.

Specifically, since the length in the vehicle vertical direction at the flange portion facing the rear door is formed to be longer than the length in the vehicle vertical direction at the flange portion facing the front door, the side body vehicle structure of the vehicle can secure a large contact area between the rear door and the side sill as compared with the case where the flange portion facing the rear door is approximately the same length in the vehicle vertical direction as the flange portion facing the front door.

Moreover, by providing a gusset member forming a closed cross section with the side sill inner member, the side body vehicle structure of the vehicle can support the upper flange portion from the inside in the vehicle width direction. With this configuration, the side body vehicle structure of the vehicle can secure a larger cross sectional area of the closed cross section formed by the side sill inner member and the gusset member in the vertical section along the vehicle width direction, as compared with the case where the flange portion facing the rear door is approximately the same length in the vehicle vertical direction as the flange portion facing the front door.

Accordingly, the side body vehicle structure of the vehicle can reinforce the part facing the rear door of the side sill by the gusset member while supporting the flange portion facing the rear door by the gusset member.

For this reason, when a compression load toward the inside in the vehicle width direction acts on the side sill, the side body vehicle structure of the vehicle can suppress collapsing deformation of the flange portion facing the rear door toward the inside in the vehicle width direction and deformation of the side sill toward the inside in the vehicle width direction.

Therefore, the side body vehicle structure of the vehicle can suppress an intrusion of the rear door into the vehicle cabin at the time of a side collision.

In one aspect of the present invention, the rear door may have a center pillar extending in the vehicle vertical direction, and the gusset member may be provided at substantially a same position in the vehicle longitudinal direction as a lower part of the center pillar.

According to this aspect of the present invention, the side body vehicle structure of the vehicle can suppress the deformation of the rear door toward the inside in the vehicle width direction at the time of the side collision and can further suppress the intrusion of the rear door into the vehicle cabin.

Specifically, since the rear door has the center pillar, the side body vehicle structure of the vehicle can improve the rigidity of the rear door.

Furthermore, since the gusset member is provided at approximately the same position in the vehicle longitudinal direction as the lower part of the center pillar, the side body vehicle structure of the vehicle can stably transmit the side collision load at the time of the side collision to the side sill through the center pillar and the gusset member.

Thus, the side body vehicle structure of the vehicle can further suppress the deformation of the rear door toward the inside in the vehicle width direction at the time of the side collision.

Accordingly, by having the center pillar in the rear door, the side body vehicle structure of the vehicle can suppress the deformation of the rear door toward the inside of the vehicle in the vehicle width direction at the time of the side collision and can further suppress the intrusion of the rear door into the vehicle cabin.

According to another aspect of the present invention, a striker that engages with a latch provided on the rear door may be provided on an upper surface of the side sill outer member and the gusset member may be provided at substantially a same position as the striker in the vehicle longitudinal direction.

According to this aspect of the present invention, when the compression load toward the inside of the vehicle in the vehicle width direction acts on the striker via the rear door, the side body vehicle structure of the vehicle can suppress the displacement of the striker toward the inside of the vehicle in the vehicle width direction by a closed cross section formed by the side sill inner member and the gusset member. Therefore, the side body vehicle structure of the vehicle can more surely suppress the intrusion of the rear door into the vehicle cabin at the time of the side collision.

In a further aspect of the present invention, the striker may be configured by a striker base provided on or connected to the upper surface of the side sill outer member and a striker main body with which the latch of the rear door engages, a catcher pin, which regulates the movement to the inside in the vehicle width direction of the rear door, may be provided on the upper surface of the side sill outer member, and the catcher pin may be adjacent to the striker main body and integrally formed with the striker base.

According to this aspect of the present invention, assembly time for the side body vehicle structure of the vehicle can be reduced, while the assemblability of the striker body for the side sill outer member and the catcher pin can be improved, as compared with the case where the striker main body and the catcher pin are separately formed.

Moreover, when the compression load toward the inside of the vehicle in the vehicle width direction acts on the catcher pin via the rear door, the side body vehicle structure of the vehicle can suppress the displacement of the catcher pin toward the inside of the vehicle in the vehicle width direction by the closed cross section formed by the side sill inner member and the gusset member. Therefore, the side body vehicle structure of the vehicle can more surely suppress the intrusion of the rear door into the vehicle cabin at the time of a side collision.

In another aspect of the present invention, the side sill inner member may be configured by an inner member front part on which the gusset member is provided and an inner member rear part connected to the rear end of the inner member front part, and the gusset member may be formed in a shape overlapping with a boundary between the inner member front part and the inner member rear part.

According to this aspect of the present invention, even when the side sill inner member is divided into the inner member front part and the inner member rear part, the side body vehicle structure of the vehicle can secure the rigidity at the boundary between the inner member front part and the inner member rear part by the gusset member.

Therefore, the side body vehicle structure of the vehicle can prevent the boundary between the inner member front part and the inner member rear part from becoming the weakest part against the compression load from the outside in the vehicle width direction.

Therefore, even when the side sill inner member is divided into the inner member front part and the inner member rear part, the side body vehicle structure of the vehicle can stably suppress the intrusion of the rear door into the vehicle cabin at the time of a side collision.

Further, in another aspect of the present invention, a floor panel, which is provided between the side sills and forms a floor surface of the vehicle, and an on-vehicle battery, which is provided on the vehicle lower part of the floor panel, may be provided, and the on-vehicle battery may be provided so as to be closest to the side sill inner member at substantially a same position as the gusset member in the vehicle longitudinal direction.

According to this aspect of the present invention, the side body vehicle structure of the vehicle can prevent a compression load toward the inside of the vehicle in the vehicle width direction from directly acting on the on-vehicle battery by the side sill, the deformation thereof toward the inside in the vehicle width direction being suppressed by the gusset member. Therefore, the side body vehicle structure of the vehicle according to this aspect, can for example provide more on-vehicle batteries for supplying electric power to a drive motor on the vehicle lower part of the floor panel.

Effects of the Invention

According to the present invention, it is possible to provide a side body vehicle structure of the vehicle that can suppress an intrusion of a rear door into the vehicle cabin at the time of a side collision.

DETAILED DESCRIPTION OF THE EMBODIMENTS

An embodiment of the present invention will be described below with reference to the drawings.

A vehicle 1 of the present embodiment is a so-called hatchback type vehicle, where a cargo space is provided in a rear part of the vehicle in a vehicle cabin which hold passengers, and a rear part of the cargo space is covered by a back door (also called a "lift gate" or "hatch") so as to be openable and closable. Such a side body vehicle structure of the vehicle 1 will be described with reference to FIG. 1 to FIG. 10.

Figure 1:
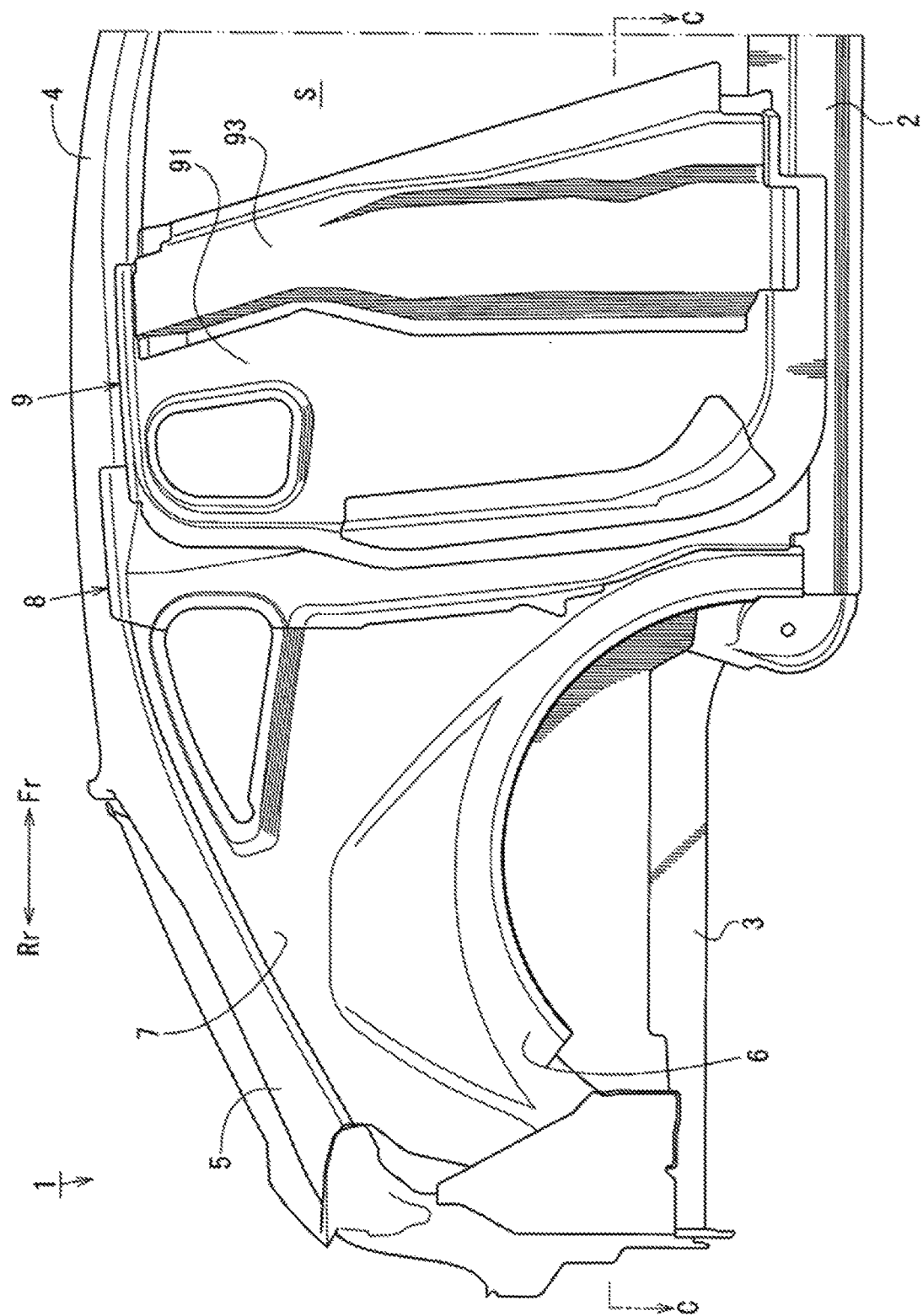
FIG. 1 is a side view showing the external appearance of a side body vehicle structure of a vehicle in a right side view.
Figure 2:
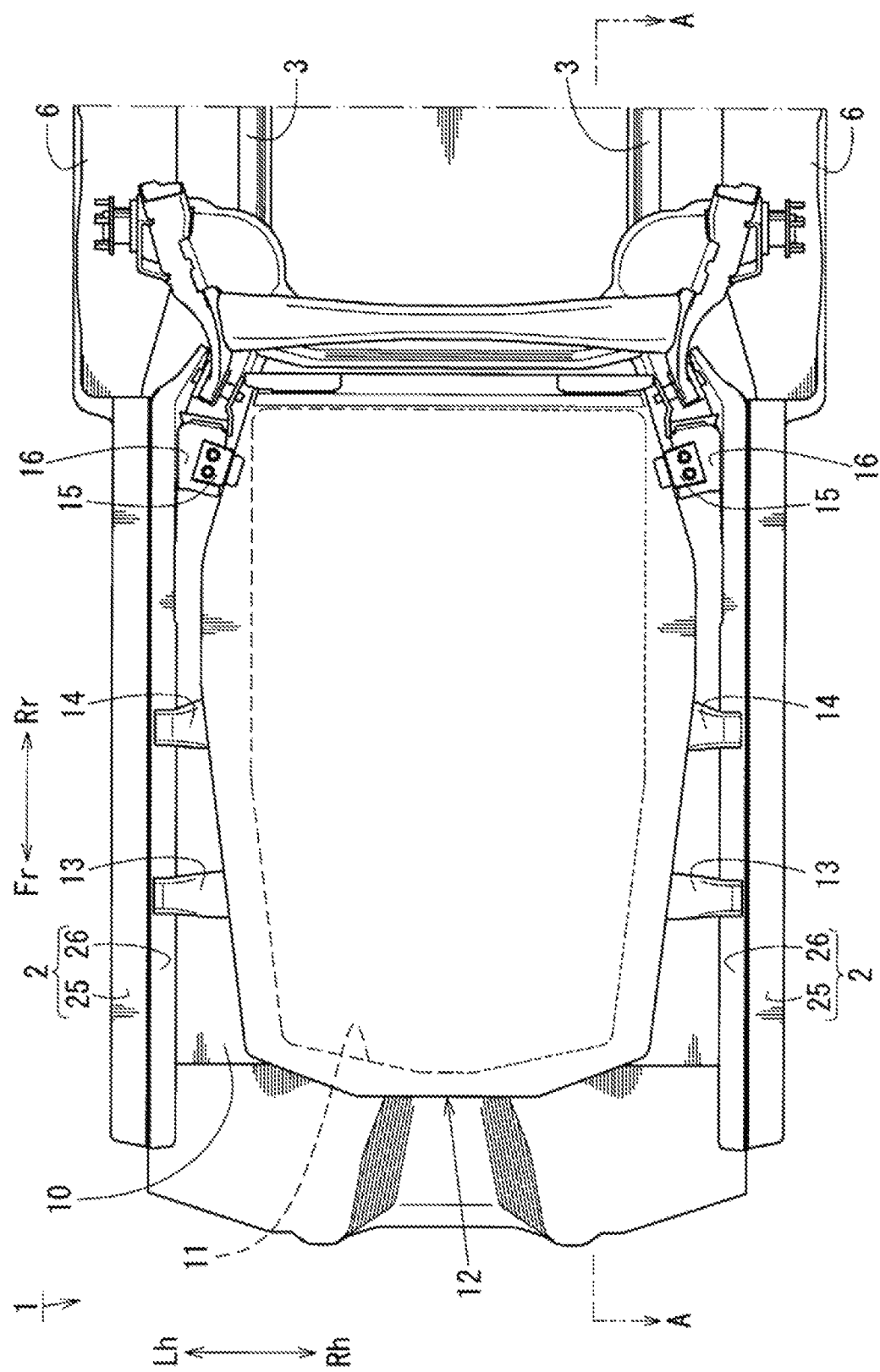
FIG. 2 is a bottom view showing the external appearance of the vehicle of FIG. 1 in a bottom surface view.
Figure 3:
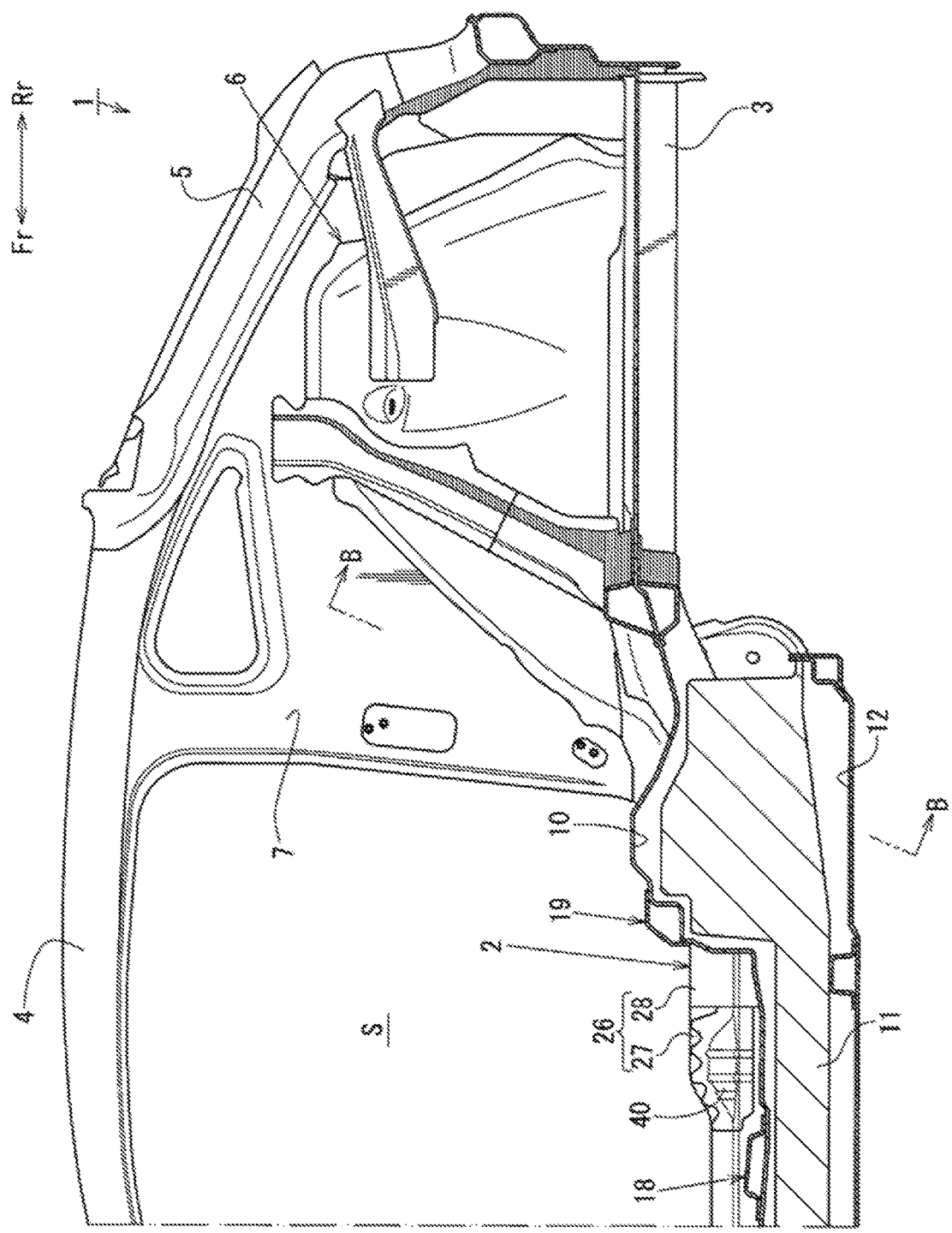
FIG. 3 is sectional view taken along A-A in FIG. 2.
Figure 4:
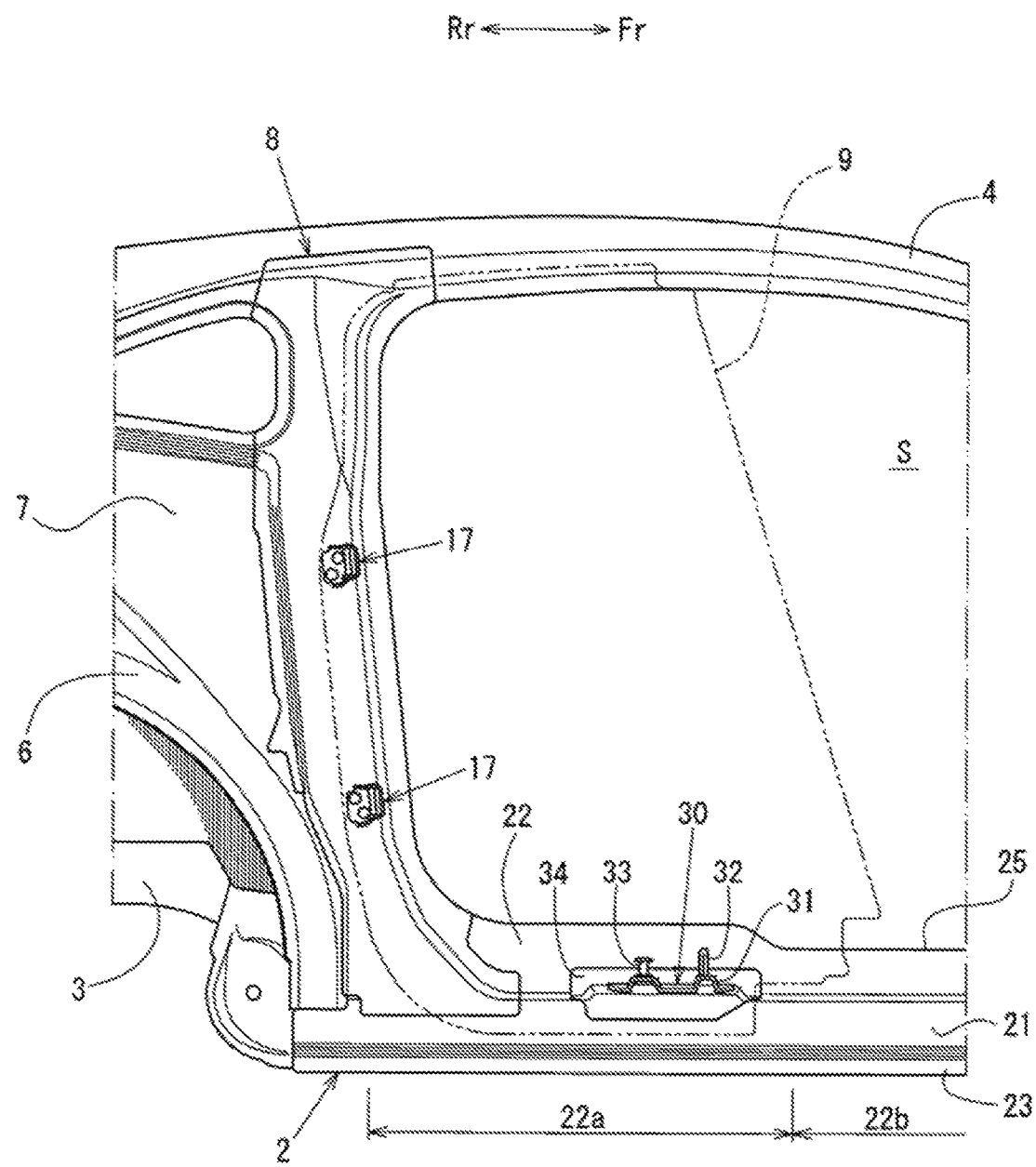
FIG. 4 is a side view showing the external appearance of the side body vehicle structure with the rear door removed.
Figure 5:
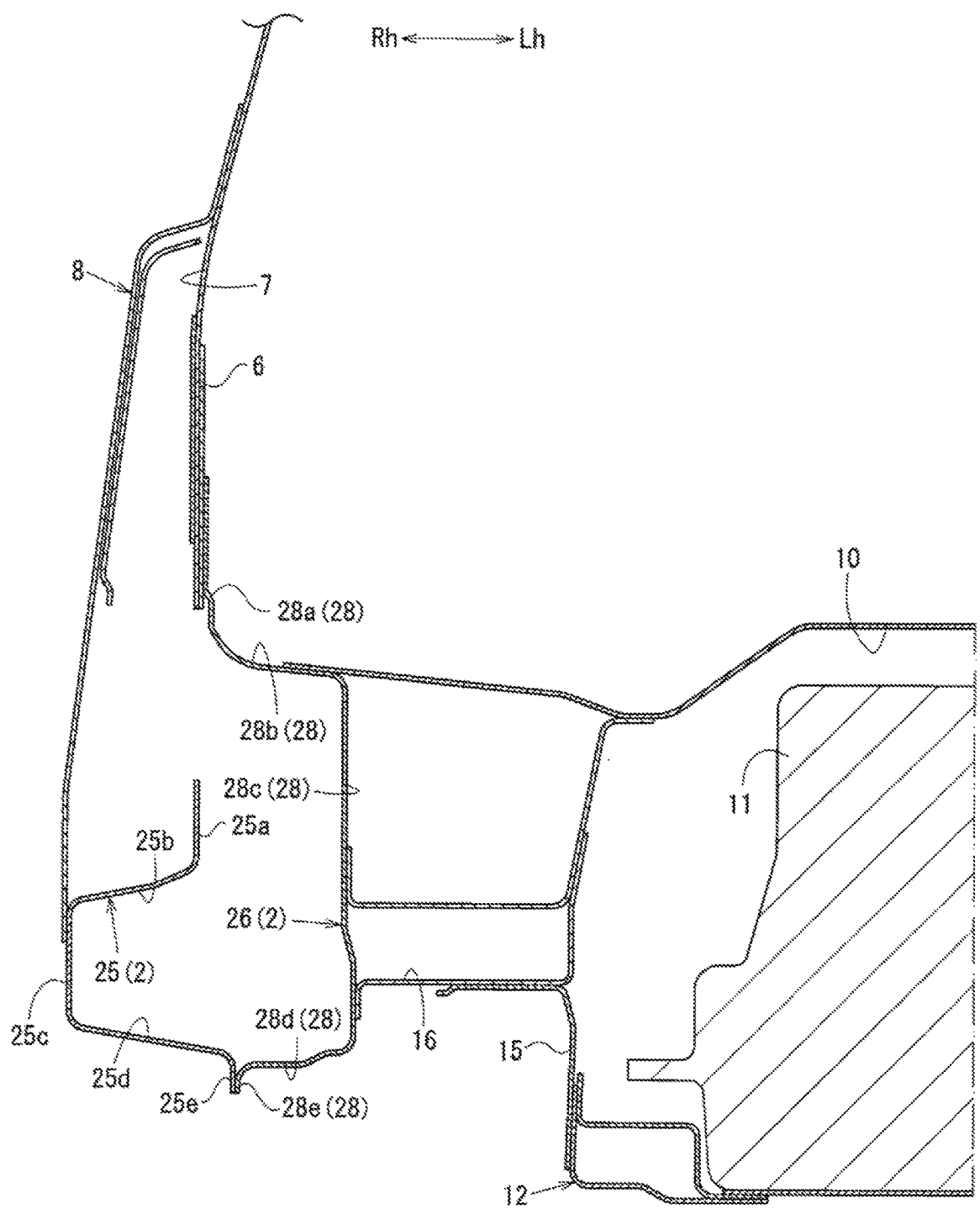
FIG. 5 is sectional view taken along B-B in FIG. 3.

Moreover, FIG. 1 shows a side view of the side body vehicle structure of the vehicle 1 in a right side view, FIG. 2 shows a bottom view of the vehicle 1 in a bottom surface view, FIG. 3 shows a cross sectional view taken along A-A in FIG. 2, FIG. 4 shows a side view of the side body vehicle structure with a rear door 9 removed, and FIG. 5 shows a cross sectional view taken along B-B in FIG. 3.

Figure 6:
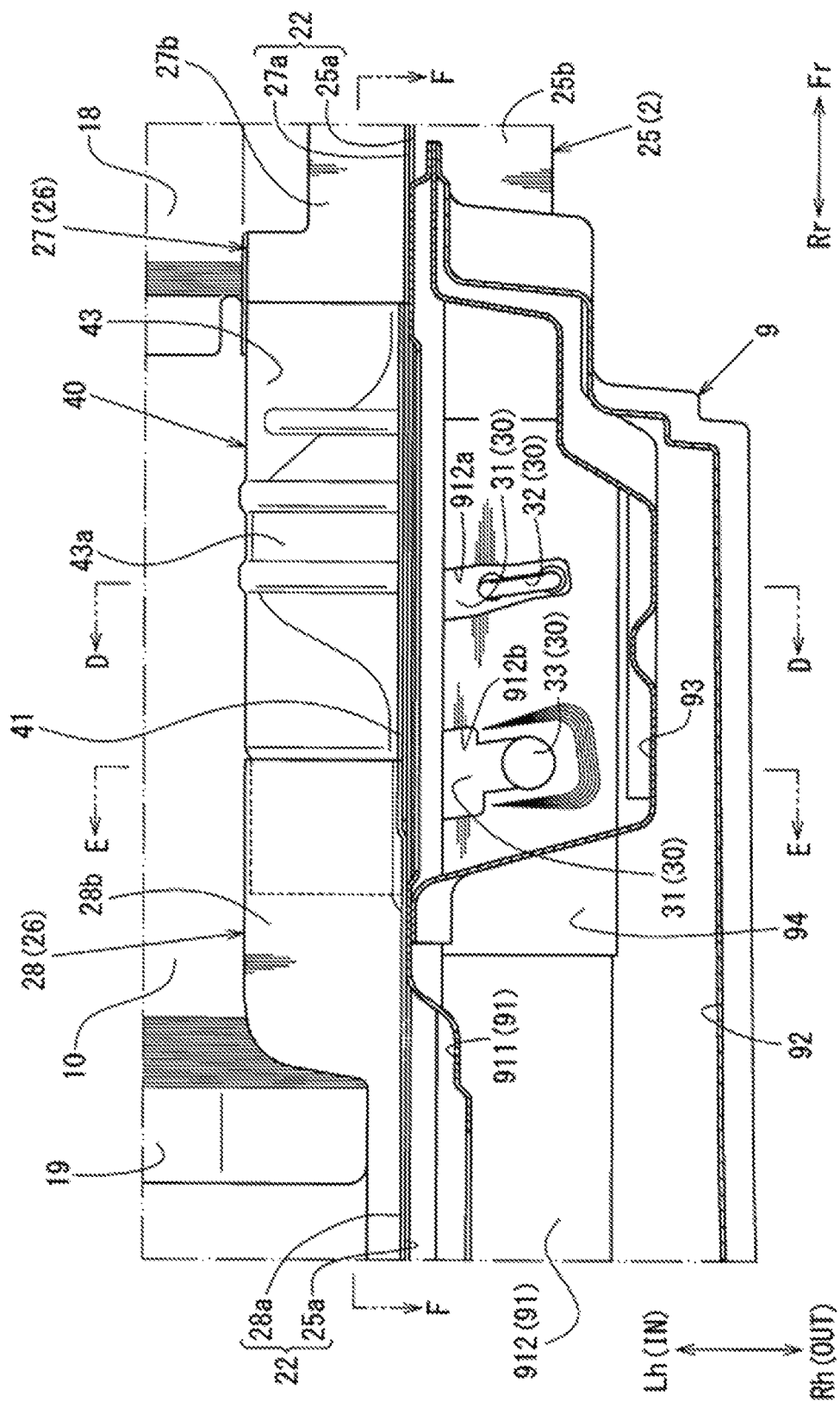
FIG. 6 is a sectional view taken along C-C in FIG. 1.
Figure 7:
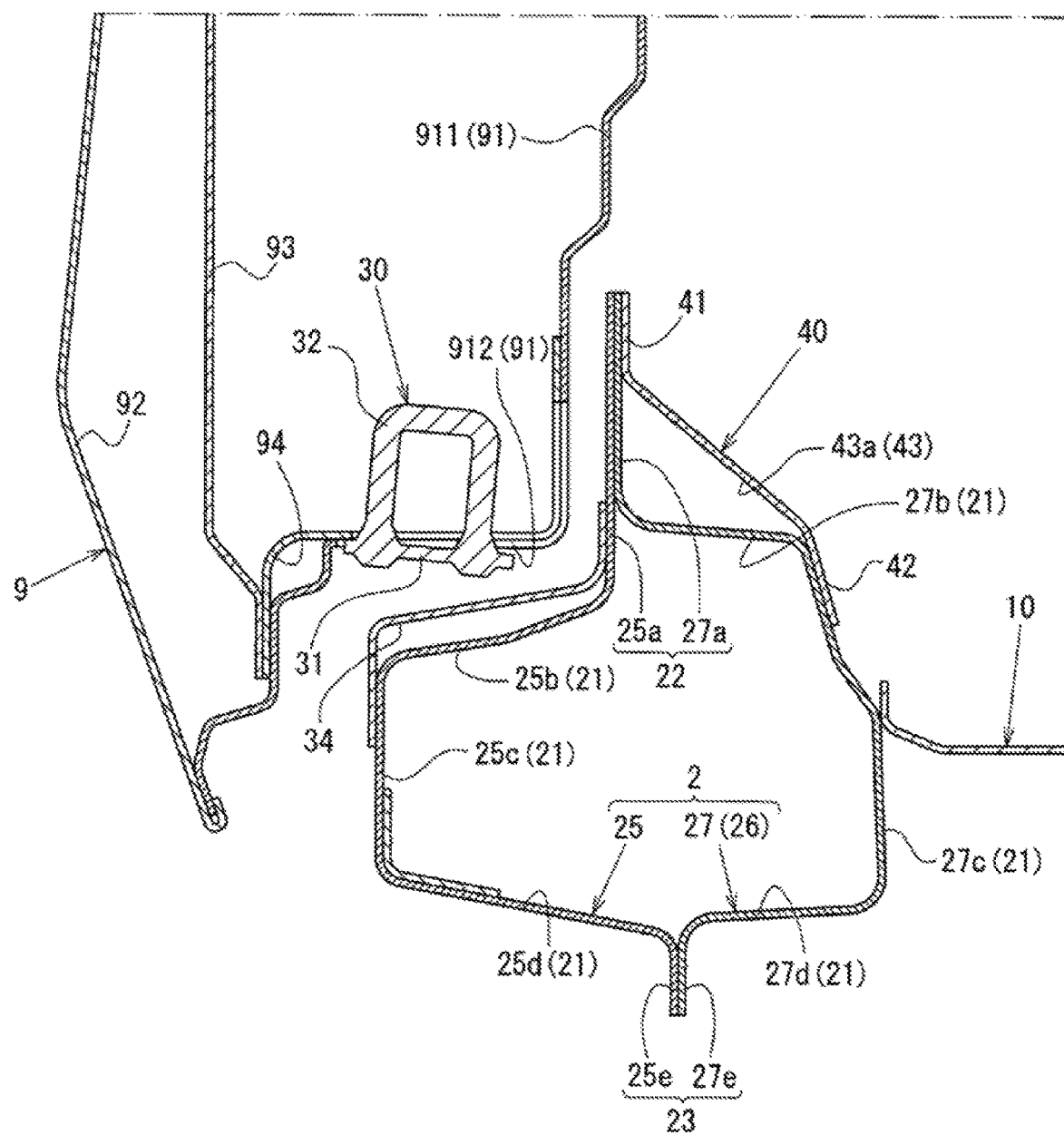
FIG. 7 is a sectional view taken along D-D in FIG. 6.
Figure 8:
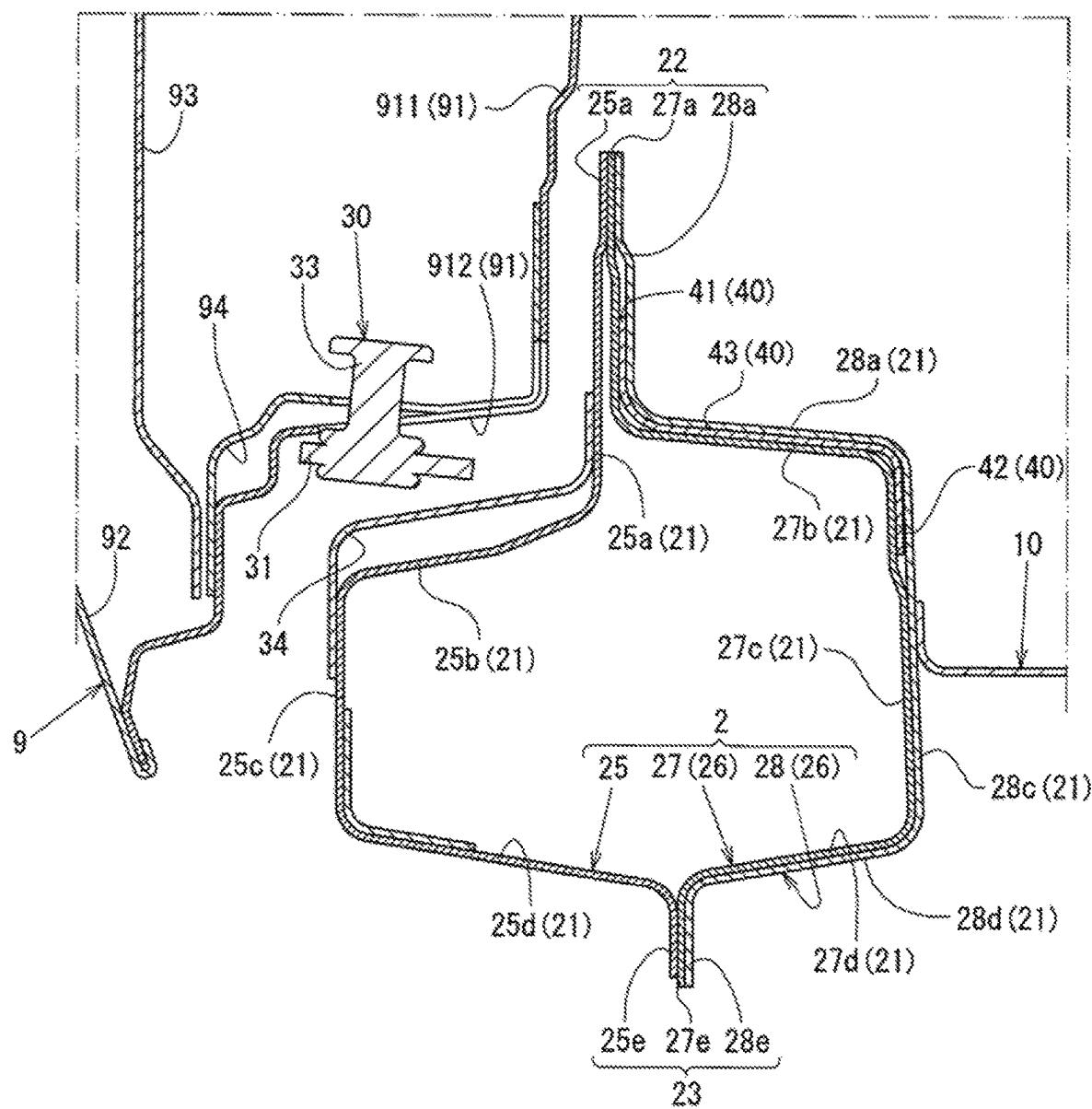
FIG. 8 is sectional view taken along E-E in FIG. 6.
Figure 9:
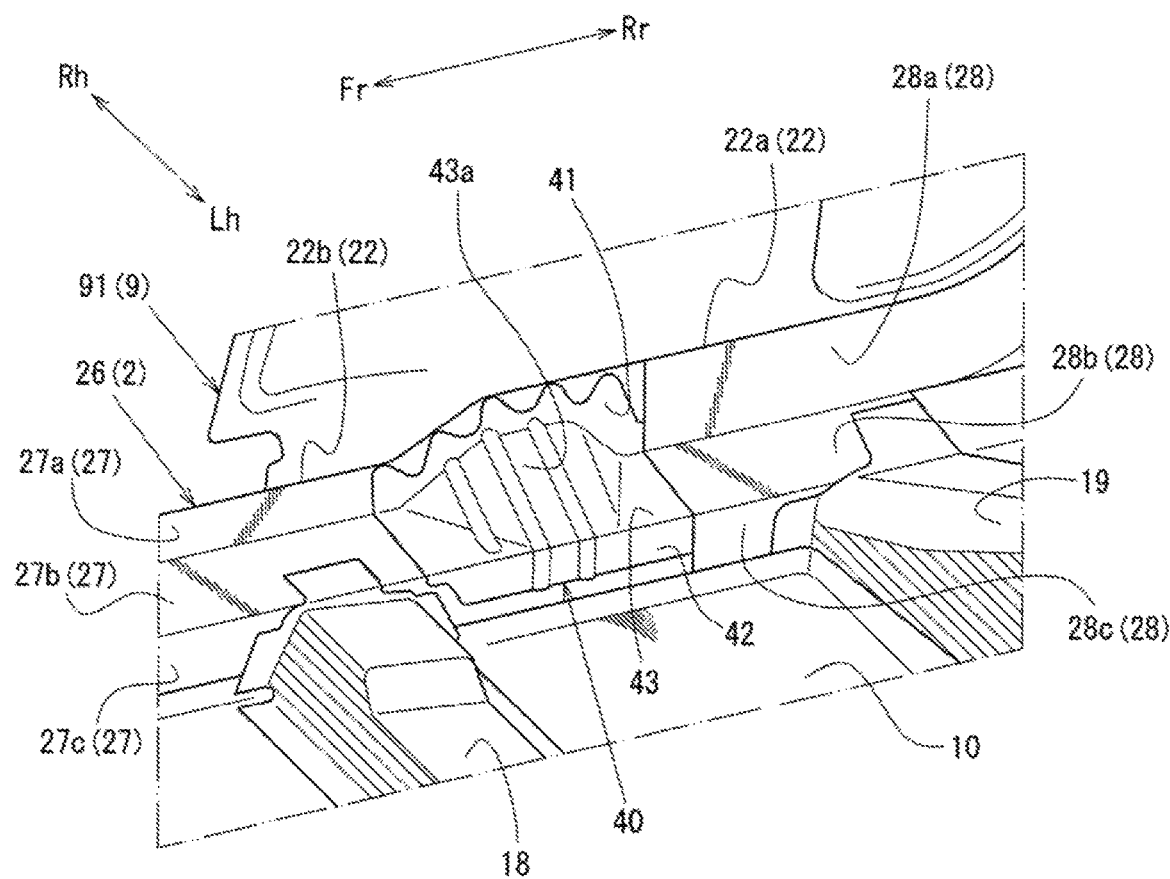
FIG. 9 is an external perspective diagram showing the external appearance of a gusset member as viewed from an inside of the vehicle in the vehicle width direction.
Figure 10:
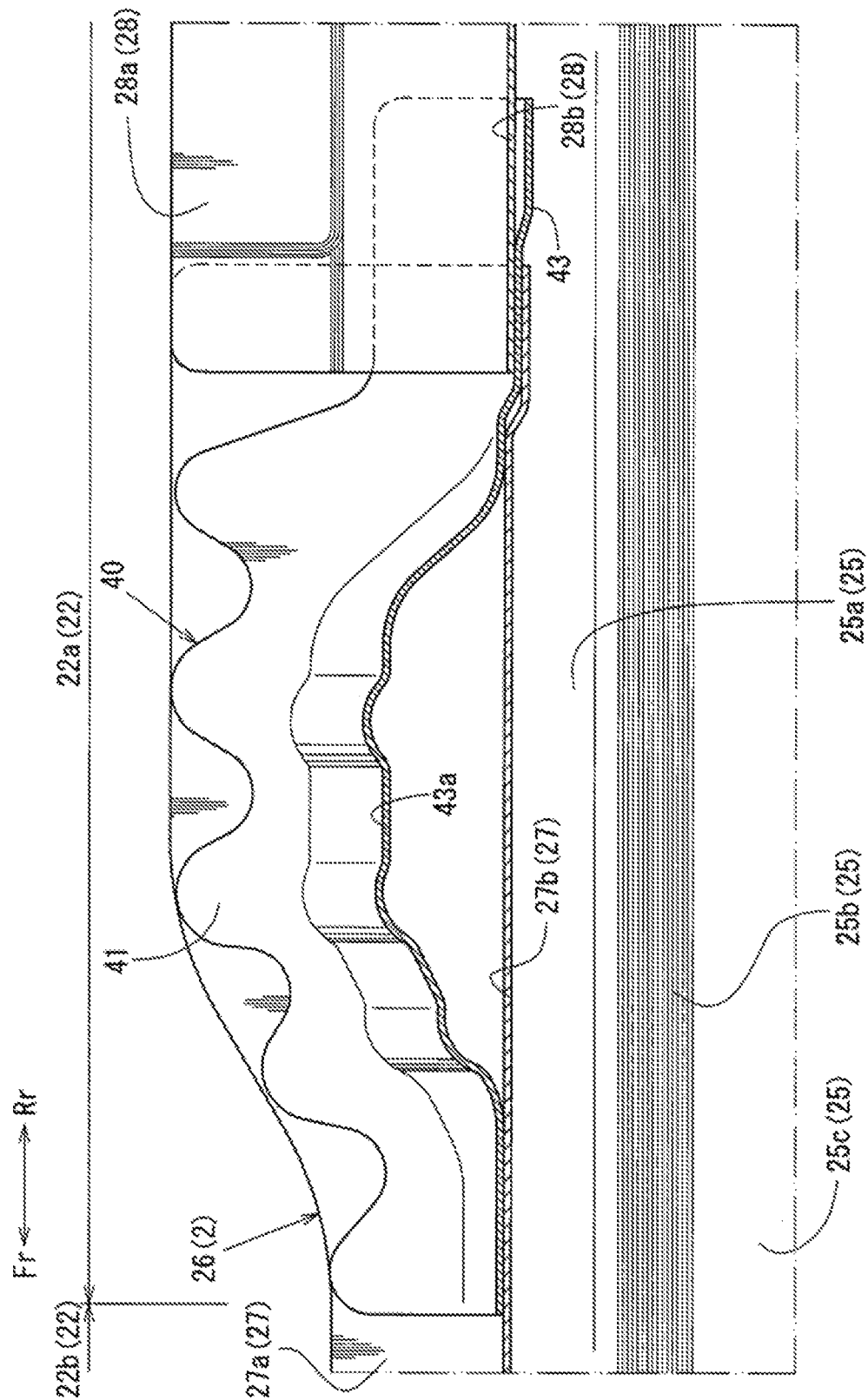
FIG. 10 is a sectional view taken along F-F in FIG. 6.

Further, FIG. 6 shows a cross sectional view taken along C-C in FIG. 1, FIG. 7 shows a cross sectional view taken along D-D in FIG. 6, FIG. 8 shows a cross sectional view taken along E-E in FIG. 6, FIG. 9 shows an external perspective diagram of the gusset member 40 as viewed from an inside of the vehicle in the vehicle width direction, and FIG. 10 shows a cross sectional view taken along F-F in FIG. 6.

Also, in order to clarify the illustration, illustration of a door outer panel 92 of the rear door 9 is omitted in FIG. 1.

Moreover, in the Figures, the arrows Fr and Rr indicate the longitudinal direction, wherein the arrow Fr indicates a forward direction, and the arrow Rr indicates a rearward direction.

Further, the arrows Rh and Lh indicate the width direction, the arrow Rh indicates a righthand (right) direction, and the arrow Lh indicates a lefthand (left) direction. In addition, the arrow IN indicates a direction toward the inside of the vehicle in the vehicle width direction (i.e., inboard), and the arrow OUT indicates a direction toward the outside of the vehicle in the vehicle width direction (i.e., outboard).

As shown in FIG. 1 and FIG. 2, the side body vehicle structure of the vehicle 1 includes a pair of left and right side sills 2 extending in the vehicle longitudinal direction at positions that are separated by a predetermined distance in the vehicle width direction, a pair of left and right rear side frames 3 extending from the rear end of the side sills 2 to a rear part of the vehicle, a pair of left and right roof side rails 4 extending in the vehicle longitudinal direction on the upper part of the vehicle above the side sills 2, and a pair of left and right rear pillars 5 extending from the rear end of the rear side frames 3 toward a lower rear part of the vehicle.

Moreover, as shown in FIG. 1 and FIG. 3, the side body vehicle structure of the vehicle 1 includes a pair of left and right rear wheel houses 6 covering rear wheels (not shown) from the upper part of the vehicle, a pair of left and right rear side panels 7 forming side walls of the rear part of the vehicle together with the rear wheel houses 6, and a pair of left and right side pillars 8 joined to the rear side panels 7 in the vicinity of a front end on an outside in the vehicle width direction of each rear side panel 7 and also forming a closed section extending in the vehicle vertical direction with the rear side panels 7.

Although not shown in detail in the Figures, the side body vehicle structure of vehicle 1 includes a pair of left and right front pillars extending toward the lower front part of the vehicle from the front end of the roof side rails 4, and a pair of left and right hinge pillars connecting the front end of the side sills 2 with the front end of the front pillars in the vehicle vertical direction.

As shown in FIG. 3 and FIG. 4, the side body vehicle structure of the vehicle 1 forms an opening surrounded by the side sills 2, the roof side rails 4, the side pillars 8, the front pillars, and the hinge pillars as a doorway S for passenger ingress and egress. As shown in FIG. 4, this doorway S is covered freely in a manner that is openable and closable by side doors that include a rear door 9 provided on a vehicle rear side of the side body vehicle structure and a front door (not shown) provided on a front side of the vehicle relative to the rear door 9.

Moreover, as shown in FIG. 2, FIG. 3, and FIG. 5, in the vehicle 1 of the present embodiment, for example, an on-vehicle battery 11 for supplying power to a traveling motor and a battery tray 12, to which the on-vehicle battery 11 is mounted and fixed, are provided at a lower part of the vehicle on a floor panel 10, which forms a floor of the vehicle 1 and connects the left and right side sills 2.

As shown in FIG. 2 and FIG. 5, the on-vehicle battery 11 is configured with a substantially rectangular shape in the bottom surface view, having a length in the vehicle longitudinal direction from a front end to a rear end of the floor panel 10 between the left and right side sills 2, and an outermost length in the vehicle width direction within a range from an approximate middle of the battery in a vehicle longitudinal direction to a rear portion of the battery in a vehicle longitudinal direction, within which range the battery outer edges are parallel and closer to each respective the side sill 2 than at locations on the battery 11 closer to a front part of the vehicle, where the battery outer edges are non-parallel and slightly angle towards the center of the vehicle in the vehicle width direction.

On the other hand, as shown in FIG. 2, FIG. 3, and FIG. 5, a battery tray 12 has an approximately polygonal shape in the bottom surface view with an area larger than that of the on-vehicle battery 11 and is formed in an approximate box shape with a portion thereof opened toward an upper part of the vehicle.

As shown in FIG. 2, the battery tray 12 is connected to the left and right side sills 2 via a pair of left and right first connection brackets 13, a pair of left and right second connection brackets 14, and a pair of left and right third connection brackets 15.

Specifically, as shown in FIG. 2, the left and right first connection brackets 13 connect the battery tray 12 with the side sills 2 (at an inner lower surface part 27d of an side sill inner member 26 described later) in the vehicle width direction at a position that is more toward a front part of the vehicle than the approximate center in the vehicle longitudinal direction of the side sills 2.

Moreover, as shown in FIG. 2, the left and right second connection brackets 14 connect the battery tray 12 with the side sills 2 (at an inner lower surface part 27d of the side sill inner member 26 described later) in the vehicle width direction at a position that is at an approximate center in the vehicle longitudinal direction of the side sills 2.

Further, as shown in FIG. 2 and FIG. 5, the left and right third connection brackets 15 connect the battery tray 12 with the side sills 2 (at an inner side surface part 28c of the side sill inner member 26 described later) in the vehicle width direction via forth connection brackets 16 at a position of the vicinity of the rear end of the side sills 2.

Subsequently, the side sills 2 and the rear door 9 among the respective constituent elements configuring the side body vehicle structure of the vehicle 1 will be described in detail.

First, the side doors of this embodiment are so-called opposite swing type side doors, in which a rear door 9 thereof is supported by the side pillar 8 on a rear side of the door via a door hinge 17 so as to be freely opened and closed and a front door thereof is supported on a front side of the door by a hinge pillar via a door hinge so as to be freely opened and closed. Moreover, the rear door 9 may be configured to be openable and closable in a state of the front door opened.

As shown in FIG. 1 and FIG. 6, the rear door 9 of the side door includes a door inner panel 91 that is a panel member covering the rear part of the doorway S, and a door outer panel 92 that is located to the outside in the vehicle width direction of the door inner panel 91 and also forms the external appearance design surface of the vehicle 1, and a center pillar 93 that is joined to the door inner panel 91.

As shown in FIG. 1, FIG. 4, and FIG. 6, the door inner panel 91 is formed in a shape in which a lower end of the front end edge thereof is located at approximately the same position in the vehicle longitudinal direction as a first floor cross member 18 provided at approximately the center in the vehicle longitudinal direction in the vehicle cabin, and also the upper edge, the rear edge, and the lower edge thereof are formed to overlap to the roof side rail 4, the side pillar 8, and the side sill 2 in the vehicle width direction, respectively.

Although not described in detail, the first floor cross member 18 connects the left and right side sills 2 in the vehicle width direction and also is formed in a shape forming a closed cross section extending in the vehicle width direction with the floor panel 10.

Further, as shown in FIG. 6 and FIG. 7, the door inner panel 91 has a door bottom part 912 provided so as to be extended toward the outside of the vehicle in the vehicle width direction from the lower end of a door side surface part 911 covering the doorway S.

As shown in FIG. 7, a door bottom part 912 is provided at a position of a part of the vehicle lower than the upper end of the side sill 2 (at an upper end of a rear door facing part 22a in an upper flange portion 22 that will be described later) and also a part of the vehicle higher than the upper surface of the side sill 2 (at an upper surface part 25b of a side sill outer member 25 that will be described later). As shown in FIG. 6 and FIG. 7, a reinforcement 94 reinforcing approximately the same range in the vehicle longitudinal direction as the center pillar 93 occupies, is joined to the upper surface of the door bottom part 912.

Additionally, as shown in FIG. 6, on the door bottom part 912, a striker opening part 912a, which is a notched opening through which a striker 30 provided on the side sill 2 can be inserted in the vehicle width direction, and a pin opening part 912b, which is a notched opening through which a catcher pin 33 can be inserted in the vehicle width direction, are formed to be open at a predetermined distance from each other in the vehicle longitudinal direction. Further, the striker 30 and the catcher pin 33 will be described later in detail.

As shown in FIG. 1 and FIG. 6, the center pillar 93 has a cross sectional shape in a horizontal cross section along the vehicle width direction that is an approximately hat-shaped and protrudes toward the outside of the vehicle in the vehicle width direction, and forms a closed cross section extending in the vehicle vertical direction by being joined to a surface toward an outside of the vehicle in vehicle width direction at the door side surface part 911 of the door inner panel 91. Herein, the term "hat shape" is used to refer to a shape having a central protrusion that resembles a crown of a hat, surrounded by a substantially flat surface resembling a brim of a hat.

Moreover, as shown in FIG. 7, the lower end of the center pillar 93 is joined to a part that extends from a lower part of the vehicle, from the edge of an outside in the vehicle width direction of the door bottom part 912, with the reinforcement 94 in between.

Further, as shown in FIG. 4 and FIG. 5, the rear ends of the left and right side sills 2 are joined to a front part of a lower end of a rear wheel house 6, a front part of a lower end of a rear side panel 7, and a lower end of the side pillar 8, and the front ends thereof are joined to the lower end of a hinge pillar (not shown).

As shown in FIG. 7, the side sills 2 are formed to have a cross sectional shape in a vertical cross section along the vehicle width direction. The cross sectional shape of the sills 2 includes a closed cross section part 21 that is a closed cross section of an approximately rectangular cross section, an upper flange portion 22 provided so as to extend toward an upper part of the vehicle from an approximate center position in the vehicle width direction on the upper surface of the closed cross section part 21, and a lower flange part 23 provided so as to extend toward a lower part of the vehicle from an approximate center position in the vehicle width direction on the lower surface of the closed cross section part 21.

Moreover, as shown in FIG. 4, the upper flange portion 22 of the side sills 2 is formed integrally with the rear door facing part 22a, which is a part facing the rear door 9, and a front door facing part 22b, which is a part facing the front door, in this order from the vehicle rear part.

As shown in FIG. 4, the rear door facing part 22a of the upper flange portion 22 is formed in a shape having a length (i.e., height in FIG. 4) in the vehicle vertical direction longer than the length (i.e., height in FIG. 4) in the vehicle vertical direction of the front door facing part 22b, as seen in a side view. In other words, the rear door facing part 22a of the upper flange portion 22 is formed in a shape where the upper end thereof is located at a part of the vehicle that is higher than the upper end of the front door facing part 22b in a side view.

More specifically, each side sill 2, as shown in FIG. 6, which has a cross sectional shape in the vertical cross section along the vehicle width direction, is joined with the side sill outer member 25, which is approximately hat-shaped in cross section and protrudes toward an outside of the vehicle in the vehicle width direction, and further is joined with the side sill inner member 26, which is approximately hat-shaped in cross section and protrudes toward an inside of the vehicle in the vehicle width direction, and thereby forms a closed cross section extending in the vehicle longitudinal direction.

The side sill outer member 25, with reference to the vertical cross section along the vehicle width direction as shown in FIG. 7, is formed integrally by an outer upper flange portion 25a that forms the upper flange portion 22 with inner upper flange portion 27a of the side sill inner member 26, an outer upper surface part 25b provided to extend toward an outside of the vehicle in the vehicle width direction from the lower end of the outer upper flange portion 25a, an outer side surface part 25c provided to extend toward a lower part of the vehicle from the outer edge in the vehicle width direction of the outer upper surface part 25b, an outer lower surface part 25d provided to extend to the inside in the vehicle width direction from the lower end of the outer side surface part 25c, and an outer lower flange part 25e provided to extend toward a lower part of the vehicle lower from an inside edge in the vehicle width direction of the outer lower surface part 25d.

As shown in FIG. 4 and FIG. 6, the striker 30, to which the rear door 9 engages, is connected to the outer upper surface part 25b of the side sill outer member 25.

More specifically, as shown in FIG. 4 and FIG. 6 to FIG. 8, the striker 30 is formed integrally by a striker base 31 connected to the outer upper surface part 25b of the side sills 2, a striker main body 32, to which a latch (not shown) provided on the rear door 9 engages, and a catcher pin 33 provided on a more rearward part of the vehicle than the striker main body 32.

As shown in FIG. 4, the striker base 31 is formed in a shape in which two parts of an approximate hat-shape in a side view protrude toward an upper part of the vehicle in a side view and are juxtaposed in the vehicle longitudinal direction. As shown in FIG. 4, the striker main body 32 is attached on a vehicle front side and the catcher pin 33 is attached on a vehicle rear side on the parts of the striker base 31 protruding toward an upper part of the vehicle.

As shown in FIG. 6, in plain view, the striker base 31 is connected to the outer upper surface part 25b of the side sill outer member 25 so that the striker main body 32 and the catcher pin 33 are located within the closed cross-section formed by the door inner panel 91 and the center pillar 93.

In other words, the striker base 31 is connected to the outer upper surface part 25b of the side sill outer member 25 so that the striker main body 32 and the catcher pin 33 are located at approximately the same position in the vehicle longitudinal direction as the lower end of the center pillar 93.

Moreover, as shown in FIG. 4, FIG. 7, and FIG. 8, the striker base 31 is connected to the side sill outer member 25 in the vertical cross section along the vehicle width direction via a striker reinforcement 34 forming a closed cross section with the side sill outer member 25.

As shown in FIG. 6 and FIG. 7, the striker main body 32 is an approximately tunnel or door shape as viewed in a front view that protrudes toward an upper part of the vehicle, and is formed into a shape capable of engaging with the latch provided on the rear door 9.

As shown in FIG. 6 and FIG. 8, the catcher pin 33 is integrally formed with an approximately cylindrical part extending toward the upper part of the vehicle from the striker base 31 and with an approximately disk-shaped part having a predetermined thickness in the vehicle vertical direction. The catcher pin 33 is provided as a regulating member for regulating (i.e., limiting) a movement of the rear door 9 to the inside of the vehicle in the vehicle width direction.

Moreover, as shown in FIG. 3, FIG. 6 and FIG. 9, the side sill inner member 26 is formed by an inner member front part 27 located toward a front part of the vehicle and an inner member rear part 28 located toward a rear part of the vehicle relative to the inner member front part 27 so as to divide the rear door facing part 22a of the upper flange portion 22 at a predetermined position in the vehicle longitudinal direction between the first floor cross member 18 and a second floor cross member 19 provided toward a rear part of the vehicle at a predetermined distance relative to the first floor cross member 18.

Although not described in detail, the second floor cross member 19 connects the left and right side sills 2 in the vehicle width direction and also is formed in a shape forming a closed cross section extending in the vehicle width direction with the floor panel 10.

As shown in FIG. 7 and FIG. 8, the inner member front part 27 is formed integrally in the vertical cross section along the vehicle width direction by an inner upper flange portion 27a forming an upper flange portion 22 together with the side sill outer member 25, an inner upper surface part 27b provided to extend toward an inside of the vehicle in the vehicle width direction from the lower end of the inner upper flange portion 27a, an inner side surface part 27c provided to extend toward a lower part of the vehicle from an edge of the inside in the vehicle width direction on the inner upper surface part 27b, an inner lower surface part 27d provided to extend toward an outside of the vehicle in the vehicle width direction from the lower end of the inner side surface part 27c, and an inner lower flange portion 27e provided to extend toward a vehicle lower part from an outer edge in the vehicle width direction of the inner lower surface part 27d.

As shown in FIG. 8, the inner member rear part 28 is formed integrally in the vertical cross section along the vehicle width direction by an inner upper flange portion 28a forming an upper flange portion 22 together with the side sill outer member 25, an inner upper surface part 28b provided to extend to an inside of the vehicle in the vehicle width direction from the lower end of the inner upper flange portion 28a, an inner side surface part 28c provided to extend toward a lower part of the vehicle from an inside edge in the vehicle width direction of the inner upper surface part 28b, an inner lower surface part 28d provided to extend toward an outside of the vehicle in the vehicle width direction from the lower end of the inner side surface part 28c, and an inner lower flange portion 28e provided to extend toward the vehicle lower part from an edge of the outside in the vehicle width direction on the inner lower surface part 28d.

As shown in FIG. 8 and FIG. 10, the above-described inner member front part 27 and inner member rear part 28 are formed to have a length in the vehicle longitudinal direction overlapping in the vehicle vertical direction and the vehicle width direction.

Specifically, as shown in FIG. 6 and FIG. 10, the inner member front part 27 is formed in a shape having a length in the vehicle longitudinal direction where the rear end thereof is located at a more rearward part of the vehicle than the catcher pin 33, and the front end thereof is joined to the hinge pillar.

On the other hand, as shown in FIG. 6 and FIG. 10, the inner member rear part 28 is formed in a shape having a length in the vehicle longitudinal direction where the rear end thereof is located at a joined part of a front part lower end of the rear wheel house 6, a front part lower end of the rear side panel 7, and a lower end of the side pillar 8, and the front end thereof is located at approximately the same position in the vehicle longitudinal direction as the catcher pin 33.

Therefore, as shown in FIG. 8 and FIG. 10, the vicinity of the rear end of the inner member front part 27 and the vicinity of the front end of the inner member rear part 28 are overlapped with each other in the vehicle vertical direction and the vehicle width direction with a gusset member 40 to be described later therebetween and are joined to each other via the gusset member 40.

More specifically, as shown in FIG. 8 and FIG. 10, regarding the inner member front part 27 of the side sill inner member 26, the inner upper flange portion 27a thereof is joined to the outer upper flange portion 25a of the side sill outer member 25 and the inner lower flange portion 27e thereof is joined to the outer lower flange portion 25e of the side sill outer member 25.

Moreover, as shown in FIG. 8 and FIG. 10, regarding the inner member rear part 28, the upper part of the inner upper flange portion 28a thereof is directly joined to the upper part of the inner upper flange portion 27a of the inner member front part 27, and also the lower part of the inner upper flange portion 28a thereof is joined to the lower part of the inner upper flange portion 27a of the inner member front part 27 with the gusset member 40 to be described later therebetween.

Further, as shown in FIG. 8 and FIG. 10, regarding the inner member rear part 28, the inner upper surface part 28b thereof is joined to the upper surface of the inner upper flange portion 27a of the inner member front part 27 with the gusset member 40 therebetween, and the upper part of the inner side surface part 28c thereof is joined to the upper part of the inner side surface part 27c of the inner member front part 27 with the gusset member 40 therebetween.

In addition, as shown in FIG. 8 and FIG. 10, regarding the inner member rear part 28, the lower part of the inner side surface part 28c thereof is directly joined to the lower part of the inner side surface part 27c of the inner member front part 27, and the inner lower surface part 28d is directly joined to the lower surface of the inner lower surface part 27d of the inner member front part 27, and the inner lower flange portion 28e is directly joined to the inner lower flange portion 27e of the inner member front part 27.

As shown in FIG. 6 and FIG. 9, the side sill inner member 26 is joined to the rear door facing part 22a of the upper flange portion 22 of the side sill 2 at approximately the same position in the vehicle longitudinal direction as the lower part of the center pillar 93 and also a gusset member 40 is provided forming a closed section with the inner member front part 27.

As shown in FIG. 6, the gusset member 40 is formed in a shape having a length in the vehicle longitudinal direction that extends more rearward on the vehicle than the catcher pin 33 from approximately the same position in the vehicle longitudinal direction as the front end of the part protruding toward an outside of the vehicle in the vehicle width direction of the center pillar 93. Therefore, as shown in FIG. 8 and FIG. 10, the gusset member 40 is formed in a shape having a length in the vehicle longitudinal direction overlapping a vicinity of a rear end thereof with a vicinity of a rear end of the overlapped inner member front part 27 and a vicinity of the front end of the inner member rear part 28.

Specifically, as shown in FIG. 7 to FIG. 10, the gusset member 40 is formed integrally by a gusset upper surface part 43 having an upper joint part 41 joined to the inner upper flange portion 27a of the inner member front part 27, a lower joint part 42 joined to the inner side surface part 27c of the inner member front part 27, a bulged part 43a bulging toward an upper part of the vehicle between an upper side joint part 41 and a lower side joint part 42.

As shown in FIG. 7, FIG. 8, and FIG. 10, the vicinity of the rear end of the upper side joint part 41 is formed in a shape intervening between the inner upper flange portion 27a of the inner member front part 27 overlapping in the vehicle width direction and the inner upper flange portion 28a of the inner member rear part 28.

Then, the vicinity of the rear end of the upper side joint part 41 is joined to the outer upper flange portion 25a of the side sill outer member 25 via the front part 27 in an intervening state between the inner upper flange portion 27a of the inner member front part 27 overlapped in the vehicle width direction and the inner upper flange portion 28a of the inner member rear part 28.

As shown in FIG. 7, FIG. 8, and FIG. 10, the vicinity of the rear end of the lower side joint part 42 is formed in a shape that can be intervened (i.e., inserted) between an inner side surface part 27c of the inner member front part 27 overlapped in the vehicle width direction and an inner side surface part 28c of the inner member rear part 28.

Moreover, the vicinity of the rear end of the lower side joint part 42 is joined to the inner member front part 27 in an intervening state between the inner side surface part 27c of the inner member front part 27 overlapped in the vehicle width direction and the inner side surface part 28c of the inner member rear part 28.

As shown in FIG. 10, the gusset upper surface part 43 is joined to the inner member front part 27 in a state in which the vicinity of the front end thereof is joined to the inner upper surface part 27b of the inner member front part 27 and the vicinity of the rear end thereof is intervened between the inner upper surface part 27b of the inner member front part 27 overlapping in the vehicle vertical direction and the inner upper surface part 28b of the inner member rear part 28.

Moreover, as shown in FIG. 7, the bulged part 43a of the gusset upper surface part 43 is formed so as to be a closed cross sectional shape that is approximately triangular in a front view with an inner upper flange portion 27a of the inner member front part 27 and an inner upper surface part 27b of the inner member front part 27 in the vertical cross section along the vehicle width direction.

More specifically, as shown in FIG. 6, FIG. 7 and FIG. 10, the bulged part 43a of the gusset upper surface part 43 is in an approximately circular arc shape in a side view that is curved so as to protrude toward an upper part of the vehicle, and is formed in a shape bulging toward the upper part of the vehicle so as to be formed between the upper part of the inner upper flange portion 27a of the inner member front part 27 and the upper end of the inner side surface part 27c of the inner member front part 27 in the vertical cross section along the vehicle width direction.

Moreover, the bulged part 43a is formed in a shape bulging toward the upper part of the vehicle so that the upper end thereof is located at approximately the same position in the vehicle longitudinal direction as the striker main body 32 of the striker 30.

Further, as shown in FIG. 6 and FIG. 10, three beads, which are protruding toward the upper part of the vehicle and also extended along the vehicle width direction, are formed at predetermined intervals (i.e., separation distances) in the vehicle longitudinal direction in the bulged part 43a.

As described above, a side body vehicle structure of a vehicle 1 has a pair of left and right side sills 2 extending in the vehicle longitudinal direction at a predetermined distance from each other in the vehicle width direction of the vehicle 1 and opposite swing type side doors which are formed on the vehicle upper part of the side sills 2 and cover freely openably and closably a doorway S for passenger ingress and egress. The side body vehicle structure of the vehicle 1 can suppress an intrusion of a rear door 9 into the vehicle cabin at the time of a side collision, since the side sills 2 have an outer upper flange portion 25a of the approximately hat-shaped side sill outer member 25 and the upper flange portion 22 formed the inner upper flange portions 27*a* and 28*a* of the approximately hat-shaped side sill inner member 26 in the vertical cross section along the vehicle width direction, the side door has a rear door 9 that covers a rear part of the doorway S, the upper flange portion 22 facing the rear door 9 in the vehicle width direction functions as a rear door facing part 22*a*, and the upper flange portion 22 of a more forward part of the vehicle than the rear door facing part 22*a* functions as a front door facing part 22*b*, the rear door facing part 22*a* is formed in a shape having a length in the vehicle vertical direction longer than a length in a vehicle vertical direction of the front door facing part 22*b*, and a gusset member 40 forming a closed cross section with the side sill inner member 26 is provided and also an upper end thereof is joined to the rear door facing part 22*a* in the vertical cross section along the vehicle width direction.

Specifically, since the length in the vehicle vertical direction of the rear door facing part 22*a* is longer than the length in the vehicle vertical direction of the front door facing part 22*b*, the side body vehicle structure of the vehicle 1 can secure a large contact area between the rear door 9 and the side sill 2 as compared to the case where the rear door facing part 22*a* has approximately the same length in the vertical direction as the front door facing part 22*b*.

Moreover, by providing a gusset member 40 forming a closed cross section with the side sill inner member 26, the side body vehicle structure of the vehicle 1 can support the upper flange portion 22 from the inside of the vehicle in the vehicle width direction. At this point, the side body vehicle structure of the vehicle 1 can secure a large cross sectional area of a closed cross section formed by the side sill inner member 26 and the gusset member 40 in the vertical cross section along the vehicle width direction as compared to the case where the rear door facing part 22*a* has approximately the same length in the vertical direction as the front door facing part 22*b*.

According to this, the side body vehicle structure of the vehicle 1 can support the rear door facing part 22*a* by the gusset member 40 and also can reinforce the part facing the rear door 9 of the side sill 2 by the gusset member 40.

For this reason, when a compression load toward the inside of the vehicle in the vehicle width direction acts on the side sill 2, the side body vehicle structure of the vehicle 1 can suppress the collapsing deformation of the rear door facing part 22*a* toward the inside of the vehicle in the vehicle width direction and the deformation of the side sill 2 toward the inside of the vehicle in the vehicle width direction.

Therefore, the side body vehicle structure of the vehicle 1 can suppress an intrusion of the rear door 9 into the vehicle cabin at the time of a side collision.

Further, since the rear door 9 is provided with the center pillar 93 extending in the vehicle vertical direction and the gusset member 40 is provided at approximately the same position in the vehicle longitudinal direction as the lower part of the center pillar 93, the side body vehicle structure of the vehicle 1 can suppress the deformation of the rear door 9 toward the inside of the vehicle in the vehicle width direction at the time of the side collision and can further suppress the intrusion of the rear door 9 into the vehicle cabin.

Specifically, since the rear door 9 has the center pillar 93, the side body vehicle structure of the vehicle 1 can improve the rigidity of the rear door 9.

Furthermore, since the gusset member 40 is provided at approximately the same position in the vehicle longitudinal direction as the lower part of the center pillar 93, the side body vehicle structure of the vehicle 1 can stably transmit the side collision load at the time of the side collision to the side sill 2 via the center pillar 93 and the gusset member 40.

Thus, the side body vehicle structure of the vehicle 1 can further suppress the deformation of the rear door 9 toward the inside of the vehicle in the vehicle width direction at the time of the side collision.

Accordingly, by having the center pillar 93 on the rear door 9, the side body vehicle structure of the vehicle 1 can suppress the deformation of the rear door 9 toward the inside of the vehicle in the vehicle width direction at the time of the side collision and can further suppress the intrusion of the rear door 9 into the vehicle cabin.

Moreover, since the striker 30, which engages with a latch provided on the rear door 9, is provided on the upper surface of the side sill outer member 25 and the gusset member 40 is provided on approximately the same position as the striker 30 in the vehicle longitudinal direction, when the compression load toward the inside in the vehicle width direction acts on the striker 30 via the rear door 9, the side body vehicle structure of the vehicle 1 can suppress the displacement of the striker 30 toward the inside of the vehicle in the vehicle width direction by a closed cross section formed by the side sill inner member 26 and the gusset member 40. Therefore, the side body vehicle structure of the vehicle 1 can more surely suppress the intrusion of the rear door 9 into the vehicle cabin at the time of the side collision.

Further, since the striker 30 is configured with the striker base 31 connected to the upper surface of the side sill outer member 25 and the striker main body 32 engaged with the latch of the rear door 9, and the catcher pin 33 for restricting the movement of the rear door 9 to the inside of the vehicle in the vehicle width direction is provided on the upper surface of the side sill outer member 25 and formed integrally to the striker base 31 while being adjacent to the striker main body 32, the side body vehicle structure of the vehicle 1 can improve the assemblability of the striker main body 32 to the side sill outer member 25 and the catcher pin 33, and also can reduce the assembly time as compared with the case where the striker main body 32 and the catcher pin 33 are separately configured.

Furthermore, when a compression load toward the inside in the vehicle width direction acts on the catcher pin 33 via the rear door 9, the side body vehicle structure of the vehicle 1 can suppress the deformation of the catcher pin 33 toward the inside of the vehicle in the vehicle width direction by a closed cross section formed by the side sill inner member 26 and the gusset member 40. Therefore, the side body vehicle structure of the vehicle 1 can more surely suppress the intrusion of the rear door 9 into the vehicle cabin at the time of the side collision.

Further, since the side sill inner member 26 is configured by the inner member front part 27 on which the gusset member 40 is provided and the inner member rear part 28 connected to a rear end of the inner member front part 27, and the gusset member 40 is formed in a shape overlapping at a boundary between the inner member front part 27 and the inner member rear part 28, even when the side sill inner member 26 is divided into the inner member front part 27 and the inner member rear part 28, the side body vehicle structure of the vehicle 1 can secure rigidity at the boundary between the inner member front part and the inner member rear part by the gusset member 40.

Therefore, the side body vehicle structure of the vehicle 1 can prevent the boundary between the inner member front part 27 and the inner member rear part 28 from becoming the weakest part against the compression load from the outside in the vehicle width direction.

Therefore, even when the side sill inner member 26 is divided into the inner member front part 27 and the inner member rear part 28, the side body vehicle structure of the vehicle 1 can stably suppress the intrusion of the rear door 9 into the vehicle cabin at the time of the side collision.

Further, since a floor panel 10 is provided between the side sills and forms a floor surface of the vehicle 1, an on-vehicle battery 11 is provided on the vehicle lower part of the floor panel 10, and the on-vehicle battery 11 is provided so as to be closest to the side sill inner member 26 at approximately the same position in the vehicle longitudinal direction as the gusset member 40, the side body vehicle structure of the vehicle 1 can prevent the compression load toward the inside in the vehicle width direction from directly acting on the on-vehicle battery 11 by the side sills 2, of which the deformation thereof toward the inside of the vehicle in the vehicle width direction is suppressed by the gusset member 40. Therefore, the side body vehicle structure of the vehicle 1, for example, can provide more (or larger) on-vehicle batteries 11 for supplying electric power to a drive motor on the vehicle lower part of the floor panel 10.

Corresponding to the configuration of the present invention and the above described embodiment, a part raised to the vehicle upper part of the side sill outer member of the present invention corresponds to the outer upper flange portion 25a of the side sill outer member 25 of the embodiment, a part raised to the vehicle upper part of the side sill inner member corresponds to the inner upper flange portion 27a and the inner upper flange portion 28a of the side sill inner member 26, and the flange portion facing the rear door corresponds to the rear door facing part 22a, and similarly although the flange portion facing the front door corresponds to the front door facing part 22b, the present invention is not limited to only the configuration of the above described embodiment, and many other embodiments are possible.

For example, in the above described embodiment, although the side body vehicle structure is provided with the gusset member 40 in a shape bulged toward an upper part of the vehicle and with the side sill inner member 26, the present invention is not limited thereto, and as long as a gusset member forms a closed cross section with the side sill inner member 26, it may have an appropriate shape.

Figure 11:
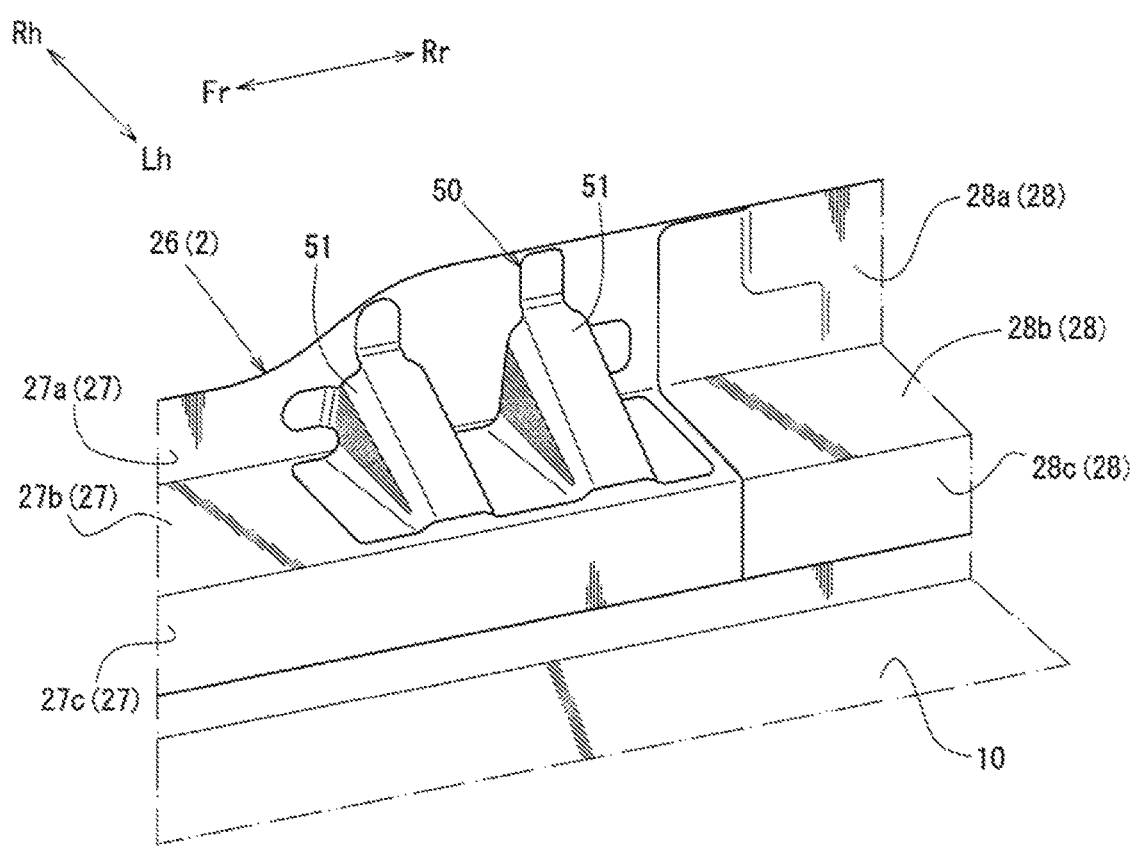
FIG. 11 is an external perspective diagram showing the external appearance of a gusset member according to another embodiment.

For example, as shown in FIG. 11, which shows an external appearance perspective view of a gusset member 50 according to another embodiment, the gusset member 50 may be provided with two protruded parts 51 having an approximately triangular shape in a front view protruding toward an upper part of the vehicle, at a predetermined interval from each other in the vehicle longitudinal direction. Even with the gusset member 50 having such a configuration, since the inner upper flange portion 27a and the inner upper surface part 27b of the inner member front part 27 and the protruded part 51 of the gusset member 50 can form a closed cross section extending in the vehicle width direction, the same effects as those of the above described embodiment can be obtained.

Moreover, although in the above described configuration the rear end of the inner member front part 27, the rear end of the gusset member 40, and the front end of the inner member rear part 28 are integrally joined in a state that the rear end of the gusset member 40 is interposed between the rear end of the overlapped inner member front part 27 and the front end of the inner member rear part 28, the embodiments are not limited thereto, and it will be appreciated that a configuration might be adopted in which the inner member front part 27, the inner member rear part 28, and the gusset member 40 are integrally joined in a state that the rear end of the gusset member 40 is further overlapped to the upper or lower surface of the overlapped part of the rear end of the inner member front part 27 and the front end of the inner member rear part 28.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 . . . Vehicle
2 . . . Side sill
9 . . . Rear door
10 . . . Floor panel
11 . . . On-vehicle battery
22 . . . upper flange portion
22a . . . Rear door facing part
22b . . . Front door facing part
25 . . . Side sill outer member
25a . . . Outer upper flange portion
26 . . . Side sill inner member
27 . . . Inner member front part
27a . . . Inner upper flange portion
28 . . . Inner member rear part
28a . . . Inner upper flange portion
30 . . . Striker
31 . . . Striker base
32 . . . Striker main body
33 . . . Catcher pin
40 . . . Gusset member
50 . . . Gusset member
93 . . . Center pillar
S . . . Doorway

We claim:

1. A side body vehicle structure of a vehicle, comprising:
left and right side sills extending in a vehicle longitudinal direction and separated by a predetermined distance in a vehicle width direction of the vehicle; and
opposite swing type side doors positioned above the side sills and covering freely openably and closably a doorway for passenger ingress and egress,
wherein each of the side sills has a respective upper flange portion, which, in a vertical cross section along the vehicle width direction, includes a portion of a side sill outer member having a substantially hat-shaped cross section that is raised in toward an upper part of the vehicle and a portion of a side sill inner member having a substantially hat-shaped cross section that is raised toward an upper part of the vehicle,
wherein the side door has a rear door that covers a rear part of the doorway,
wherein a rear door facing flange portion of the upper flange portion faces the rear door in the vehicle width direction, and a front door facing flange portion of the upper flange portion is more forward on the vehicle than the rear door facing flange portion,
wherein the rear door facing flange portion is formed in a shape having a length in a vehicle vertical direction longer than a length in the vehicle vertical direction of the front door facing flange portion, and wherein a gusset member is provided, which, in a vertical cross section along the vehicle width direction, has an upper end joined to the rear door facing flange portion and forms a closed cross section with the side sill inner member.

2. The side body vehicle structure of a vehicle according to claim 1,
wherein the rear door has a center pillar extending in the vehicle vertical direction and the gusset member is provided at substantially a same position in the vehicle longitudinal direction as a lower part of the center pillar.

3. The side body vehicle structure of a vehicle according to claim 2, comprising:
a striker that engages with a latch provided on the rear door on an upper surface of the side sill outer member,
wherein the gusset member is provided at substantially a same position as the striker in the vehicle longitudinal direction.

4. The side body vehicle structure of a vehicle according to claim 2, comprising:
a floor panel provided between the side sills that forms a floor surface of the vehicle, and an on-vehicle battery provided on the vehicle lower part of the floor panel,
wherein the on-vehicle battery is provided so as to be closest to the side sill inner member at approximately a same position in the vehicle longitudinal direction as the gusset member.

5. The side body vehicle structure of a vehicle according to claim 1,
wherein the gusset member is joined to an inner upper flange portion of the upper flange portion, and to an inner upper surface part of the side sill inner member, and
wherein the gusset member, the inner upper flange portion, and the inner upper surface part form the closed cross section.

6. A side body vehicle structure of a vehicle, comprising:
left and right side sills extending in a vehicle longitudinal direction and separated by a predetermined distance in a vehicle width direction of the vehicle; and
opposite swing type side doors positioned above the side sills and covering freely openably and closably a doorway for passenger ingress and egress,
wherein each of the side sills has a respective upper flange portion, which, in a vertical cross section along the vehicle width direction, includes a portion of a side sill outer member having a substantially hat-shaped cross section that is raised in toward an upper part of the vehicle and a portion of a side sill inner member having a substantially hat-shaped cross section that is raised toward an upper part of the vehicle,
wherein the side door has a rear door that covers a rear part of the doorway,
wherein a rear door facing flange portion of the upper flange portion faces the rear door in the vehicle width direction, and a front door facing flange portion of the upper flange portion is more forward on the vehicle than the rear door facing flange portion,
wherein the rear door facing flange portion is formed in a shape having a length in a vehicle vertical direction longer than a length in the vehicle vertical direction of the front door facing flange portion,
wherein a gusset member is provided, which, in a vertical cross section along the vehicle width direction, has an upper end joined to the rear door facing flange portion and forms a closed cross section with the side sill inner member,
wherein the rear door has a center pillar extending in the vehicle vertical direction and the gusset member is provided at substantially a same position in the vehicle longitudinal direction as a lower part of the center pillar,
wherein a striker that engages with a latch is provided on the rear door on an upper surface of the side sill outer member,
wherein the gusset member is provided at substantially a same position as the striker in the vehicle longitudinal direction,
wherein a catcher pin for restricting movement of the rear door toward an inside of the vehicle in the vehicle width direction is provided on the upper surface of the side sill outer member, and
wherein the striker includes a striker base connected to the upper surface of the side sill outer member and a striker main body with which the latch of the rear door engages, and wherein the catcher pin is adjacent to the striker main body and is formed integrally with the striker base.

7. The side body vehicle structure of a vehicle according to claim 6,
wherein the side sill inner member includes an inner member front part on which the gusset member is provided, and an inner member rear part connected to a rear end of the inner member front part, and wherein the gusset member is formed in a shape overlapping at a boundary between the inner member front part and the inner member rear part.

8. The side body vehicle structure of a vehicle according to claim 6, comprising:
a floor panel provided between the side sills that forms a floor surface of the vehicle, and an on-vehicle battery provided on the vehicle lower part of the floor panel,
wherein the on-vehicle battery is provided so as to be closest to the side sill inner member at approximately a same position in the vehicle longitudinal direction as the gusset member.

9. A side body vehicle structure of a vehicle, comprising:
left and right side sills extending in a vehicle longitudinal direction and separated by a predetermined distance in a vehicle width direction of the vehicle; and
opposite swing type side doors positioned above the side sills and covering freely openably and closably a doorway for passenger ingress and egress,
wherein each of the side sills has a respective upper flange portion, which, in a vertical cross section along the vehicle width direction, includes a portion of a side sill outer member having a substantially hat-shaped cross section that is raised in toward an upper part of the vehicle and a portion of a side sill inner member having a substantially hat-shaped cross section that is raised toward an upper part of the vehicle,
wherein the side door has a rear door that covers a rear part of the doorway,
wherein a rear door facing flange portion of the upper flange portion faces the rear door in the vehicle width direction, and a front door facing flange portion of the upper flange portion is more forward on the vehicle than the rear door facing flange portion,
wherein the rear door facing flange portion is formed in a shape having a length in a vehicle vertical direction longer than a length in the vehicle vertical direction of the front door facing flange portion, wherein a gusset member is provided, which, in a vertical cross section along the vehicle width direction, has an upper end joined to the rear door facing flange portion and forms a closed cross section with the side sill inner member, wherein the rear door has a center pillar extending in the vehicle vertical direction and the gusset member is provided at substantially a same position in the vehicle longitudinal direction as a lower part of the center pillar, wherein the side sill inner member includes an inner member front part on which the gusset member is provided, and an inner member rear part connected to a rear end of the inner member front part, and wherein the gusset member is formed in a shape overlapping at a boundary between the inner member front part and the inner member rear part.

10. The side body vehicle structure of a vehicle according to claim 9, comprising:

a floor panel provided between the side sills that forms a floor surface of the vehicle, and an on-vehicle battery provided on the vehicle lower part of the floor panel, wherein the on-vehicle battery is provided so as to be closest to the side sill inner member at approximately a same position in the vehicle longitudinal direction as the gusset member.

* * * * *